US012576979B2

(12) United States Patent
Tomes et al.

(10) Patent No.: US 12,576,979 B2
(45) Date of Patent: Mar. 17, 2026

(54) AIRCRAFT PROPULSION SYSTEM WITH ENGINE ASSEMBLY, INTERCOOLER, AND TURBOCOMPRESSOR ASSEMBLY

(71) Applicant: Pratt & Whitney Canada Corp., Longueuil (CA)

(72) Inventors: Nathan Tomes, Hamilton (CA); Michel Bousquet, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 22 days.

(21) Appl. No.: 18/591,141

(22) Filed: Feb. 29, 2024

(65) Prior Publication Data
US 2025/0276795 A1 Sep. 4, 2025

(51) Int. Cl.
| | |
|---|---|
| *B64D 27/33* | (2024.01) |
| *B64D 33/08* | (2006.01) |
| *B64U 10/14* | (2023.01) |
| *B64U 20/94* | (2023.01) |
| *B64U 20/96* | (2023.01) |
| *B64U 50/12* | (2023.01) |
| *B64U 50/19* | (2023.01) |

(52) U.S. Cl.
CPC ............. *B64D 27/33* (2024.01); *B64D 33/08* (2013.01); *B64U 20/94* (2023.01); *B64U 20/96* (2023.01); *B64U 50/12* (2023.01); *B64U 50/19* (2023.01); *B64U 10/14* (2023.01)

(58) Field of Classification Search
None
See application file for complete search history.

(56) References Cited

U.S. PATENT DOCUMENTS

| | | | | |
|---|---|---|---|---|
| 9,677,466 | B2 | 6/2017 | Smaoui | |
| 11,802,489 | B1 | 10/2023 | Spierling | |
| 11,866,181 | B2 * | 1/2024 | Dussault | F02C 6/12 |
| 12,043,402 | B1 * | 7/2024 | Lu | F02C 6/12 |
| 12,162,613 | B1 * | 12/2024 | Wang | B64D 31/18 |
| 2012/0324903 | A1 | 12/2012 | Dewis | |
| 2017/0029131 | A1 | 2/2017 | Steinwandel | |

(Continued)

OTHER PUBLICATIONS

EP search report for EP25160724.8 dated Jul. 23, 2025.

*Primary Examiner* — Arfan Y. Sinaki
(74) *Attorney, Agent, or Firm* — Getz Balich LLC

(57) ABSTRACT

A propulsion system for an aircraft includes an air intake, an engine assembly, a turbocompressor, an electrical assembly, and at least one propulsor. The engine assembly includes an engine. The engine includes an air inlet, an exhaust outlet, and an engine output shaft. The turbocompressor assembly includes a turbocompressor. The turbocompressor includes a turbine and a compressor. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The turbine includes a turbine inlet and a turbine outlet. The turbine inlet is connected in fluid communication with the exhaust outlet. The compressor includes a compressor inlet and a compressor outlet. The compressor inlet is connected in fluid communication with the air intake. The rotational assembly is mechanically independent of the engine output shaft.

16 Claims, 10 Drawing Sheets

(56)                References Cited

U.S. PATENT DOCUMENTS

| 2018/0202358 A1 | 7/2018 | Julien | |
| 2019/0153938 A1* | 5/2019 | Hammoud | F02C 7/185 |
| 2019/0368417 A1* | 12/2019 | Terwilliger | F02C 9/18 |
| 2020/0003115 A1 | 1/2020 | Jones | |
| 2023/0303259 A1* | 9/2023 | Matsumoto | H02J 7/1423 |
| 2023/0399115 A1 | 12/2023 | Anderson | |
| 2024/0067154 A1* | 2/2024 | Kim | B64D 27/00 |
| 2025/0250016 A1* | 8/2025 | Tomes | F02C 5/00 |

* cited by examiner

AIRCRAFT PROPULSION SYSTEM WITH ENGINE ASSEMBLY, INTERCOOLER, AND TURBOCOMPRESSOR ASSEMBLY

TECHNICAL FIELD

This disclosure relates to a propulsion system for an aircraft.

BACKGROUND OF THE ART

A propulsion system for an aircraft may be configured, for example, with an engine assembly configured to drive rotation of a propulsor for the aircraft. Various configurations of such aircraft propulsion systems are known in the art. While these known aircraft propulsion systems may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes an air intake, an engine assembly, a turbocompressor, an electrical assembly, and at least one propulsor. The engine assembly includes an engine and an intercooler. The engine includes an air inlet, an exhaust outlet, and an engine output shaft. The intercooler includes a first heat exchanger side having a first inlet and a first outlet and a second heat exchanger side having a second inlet and a second outlet. The first outlet is connected in fluid communication with the air inlet. The second inlet is connected in fluid communication with the air intake. The turbocompressor assembly includes a turbocompressor. The turbocompressor includes a turbine and a compressor. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The turbine includes a turbine inlet and a turbine outlet. The turbine inlet is connected in fluid communication with the exhaust outlet. The compressor includes a compressor inlet and a compressor outlet. The compressor inlet is connected in fluid communication with the air intake. The compressor outlet is connected in fluid communication with the first inlet. The rotational assembly is mechanically independent of the engine output shaft. The electrical assembly includes a first electric motor-generator and an electrical distribution system. The first electric motor-generator is operably connected to the engine output shaft. The first electric motor-generator is electrically connected to the electrical distribution system. The at least one propulsor includes an electric motor and a propulsor rotor. The electric motor is electrically connected to the electrical distribution system. The propulsor rotor is operably connected to the electric motor.

In any of the aspects or embodiments described above and herein, the propulsion system may further include a cooling fan including a fan rotor and an input shaft. The input shaft may be connected to the fan rotor. The input shaft may be operably connected to the rotational assembly. The cooling fan may include a cooling fan inlet and at least one cooling fan outlet. The cooling fan may be connected in fluid communication with the second heat exchanger side to direct ambient air from the air intake through the second heat exchanger side.

In any of the aspects or embodiments described above and herein, the cooling fan may be connected in fluid communication with and between the air intake and the second heat exchanger side with the cooling fan inlet connected in fluid communication with the air intake and the at least one cooling fan outlet connected in fluid communication with the second inlet.

In any of the aspects or embodiments described above and herein, the cooling fan may be configured to exhaust ambient air from the air intake through the at least one cooling fan outlet to generate lift for the aircraft.

In any of the aspects or embodiments described above and herein, the electrical assembly may include a second electric motor-generator operably connected to the shaft. The second electric motor-generator may be electrically connected to the electrical distribution system.

In any of the aspects or embodiments described above and herein, the turbocompressor assembly may further include a gearbox. The gearbox may operably connect the shaft, the input shaft, and the second electric motor-generator.

In any of the aspects or embodiments described above and herein, the propulsion system may further include a cooling fan including an electric motor, a fan rotor, a cooling fan inlet, and at least one cooling fan outlet. The electric motor may be electrically connected to the electrical distribution system. The electric motor may be operably connected to the fan rotor. The cooling fan may be connected in fluid communication with the second heat exchanger side to direct ambient air from the air intake through the second heat exchanger side.

In any of the aspects or embodiments described above and herein, the cooling fan may be connected in fluid communication with and downstream of the second heat exchanger side. The cooling fan inlet may be connected in fluid communication with the second outlet.

In any of the aspects or embodiments described above and herein, the engine assembly may include an interburner. The interburner may include an interburner inlet and an interburner outlet. The interburner may be connected in fluid communication with and between the engine and the turbine with the interburner inlet connected in fluid communication with the exhaust outlet and the interburner outlet connected in fluid communication with the turbine inlet.

In any of the aspects or embodiments described above and herein, the electrical assembly may further include an energy storage device electrically connected to the electrical distribution system.

In any of the aspects or embodiments described above and herein, each of the at least one propulsor may be connected in fluid communication with the intercooler outlet.

In any of the aspects or embodiments described above and herein, the engine may be an intermittent combustion engine.

According to another aspect of the present disclosure, an unmanned aerial vehicle (UAV) includes an air intake, a turbocompressor assembly, a cooling fan, and an engine assembly. The turbocompressor assembly includes a turbocompressor. The turbocompressor includes a turbine and a compressor. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The turbine includes a turbine inlet and a turbine outlet. The compressor includes a compressor inlet and a compressor outlet. The cooling fan includes a fan rotor and an input shaft. The input shaft is connected to the fan rotor. The input shaft is operably connected to the rotational assembly. The cooling fan includes a cooling fan inlet and at least one cooling fan outlet. The cooling fan inlet is connected in fluid communication with the air intake. The cooling fan outlet is connected in fluid communication with the compressor inlet. The engine assembly includes an engine and an intercooler. The engine includes an air inlet, an exhaust outlet, and an engine output shaft. The exhaust outlet is connected in fluid communication with the turbine inlet. The intercooler includes a first heat exchanger side having a first inlet and a first outlet and a second heat exchanger side having a second inlet and a second outlet. The first inlet is connected in fluid communication with the compressor outlet. The first outlet is connected in fluid communication with the air inlet. The second inlet is connected in fluid communication with the cooling fan outlet.

In any of the aspects or embodiments described above and herein, the UAV may further include an electrical assembly including a first electric motor-generator, a second electric motor-generator, and an electrical distribution system. The first electric motor-generator may be operably connected to the engine output shaft. The first electric motor-generator may be electrically connected to the electrical distribution system. The second electric motor-generator is operably connected to the rotational assembly. The second electric motor-generator is electrically connected to the electrical distribution system.

In any of the aspects or embodiments described above and herein, the input shaft may be operably connected to the rotational assembly and the second electric motor-generator.

In any of the aspects or embodiments described above and herein, the UAV may further include at least one propulsor including an electric motor and a propulsor rotor. The electric motor may be electrically connected to the electrical distribution system. The propulsor rotor may be operably connected to the electric motor.

According to another aspect of the present disclosure, a propulsion system for an aircraft includes an air intake, an engine assembly, a turbocompressor assembly, and an electrical assembly. The engine assembly includes an engine, an interburner, and an intercooler. The engine includes an air inlet, an exhaust outlet, and an engine output shaft. The interburner includes an interburner inlet and an interburner outlet. The interburner inlet is connected in fluid communication with the exhaust outlet. The intercooler includes a first heat exchanger side having a first inlet and a first outlet and a second heat exchanger side having a second inlet and a second outlet. The first outlet is connected in fluid communication with the air inlet. The second inlet is connected in fluid communication with the air intake. The turbocompressor assembly includes a turbocompressor. The turbocompressor includes a turbine and a compressor. The turbine and the compressor form a rotational assembly. The rotational assembly includes a shaft, a bladed turbine rotor of the turbine, and a bladed compressor rotor of the compressor. The shaft interconnects the bladed turbine rotor and the bladed compressor rotor. The turbine includes a turbine inlet and a turbine outlet. The turbine inlet is connected in fluid communication with the interburner outlet. The compressor includes a compressor inlet and a compressor outlet. The compressor inlet is connected in fluid communication with the air intake. The compressor outlet is connected in fluid communication with the first inlet. The rotational assembly is mechanically independent of the engine output shaft. The electrical assembly includes a first electric motor-generator, a second electric motor-generator, and an electrical distribution system. The first electric motor-generator is operably connected to the engine output shaft. The first electric motor-generator is electrically connected to the electrical distribution system. The second electric motor-generator is operably connected to the rotational assembly. The second electric motor-generator is electrically connected to the electrical distribution system.

In any of the aspects or embodiments described above and herein, the propulsion system may further include a cooling fan including a fan rotor and an input shaft. The input shaft may be connected to the fan rotor. The input shaft may be operably connected to the rotational assembly. The cooling fan may include a cooling fan inlet and at least one cooling fan outlet. The cooling fan inlet may be connected in fluid communication with the air intake. The at least one cooling fan outlet may be connected in fluid communication with the compressor inlet and the second inlet.

In any of the aspects or embodiments described above and herein, the cooling fan may be configured to exhaust ambient air from the air intake through the at least one cooling fan outlet to generate lift for the aircraft.

In any of the aspects or embodiments described above and herein, the propulsion system may further include an engine exhaust diverter assembly connected in fluid communication with and between the exhaust outlet, the interburner inlet, and the turbine inlet. The engine exhaust diverter assembly may be selectively configurable in a first condition or a second condition: in the first condition, the engine exhaust diverter subassembly may connect the exhaust outlet in fluid communication with the interburner inlet and, in the second condition, the engine exhaust diverter subassembly may connect the exhaust outlet in fluid communication with the turbine inlet.

The present disclosure, and all its aspects, embodiments and advantages associated therewith will become more readily apparent in view of the detailed description provided below, including the accompanying drawings.

DETAILED DESCRIPTION

Figure 1:
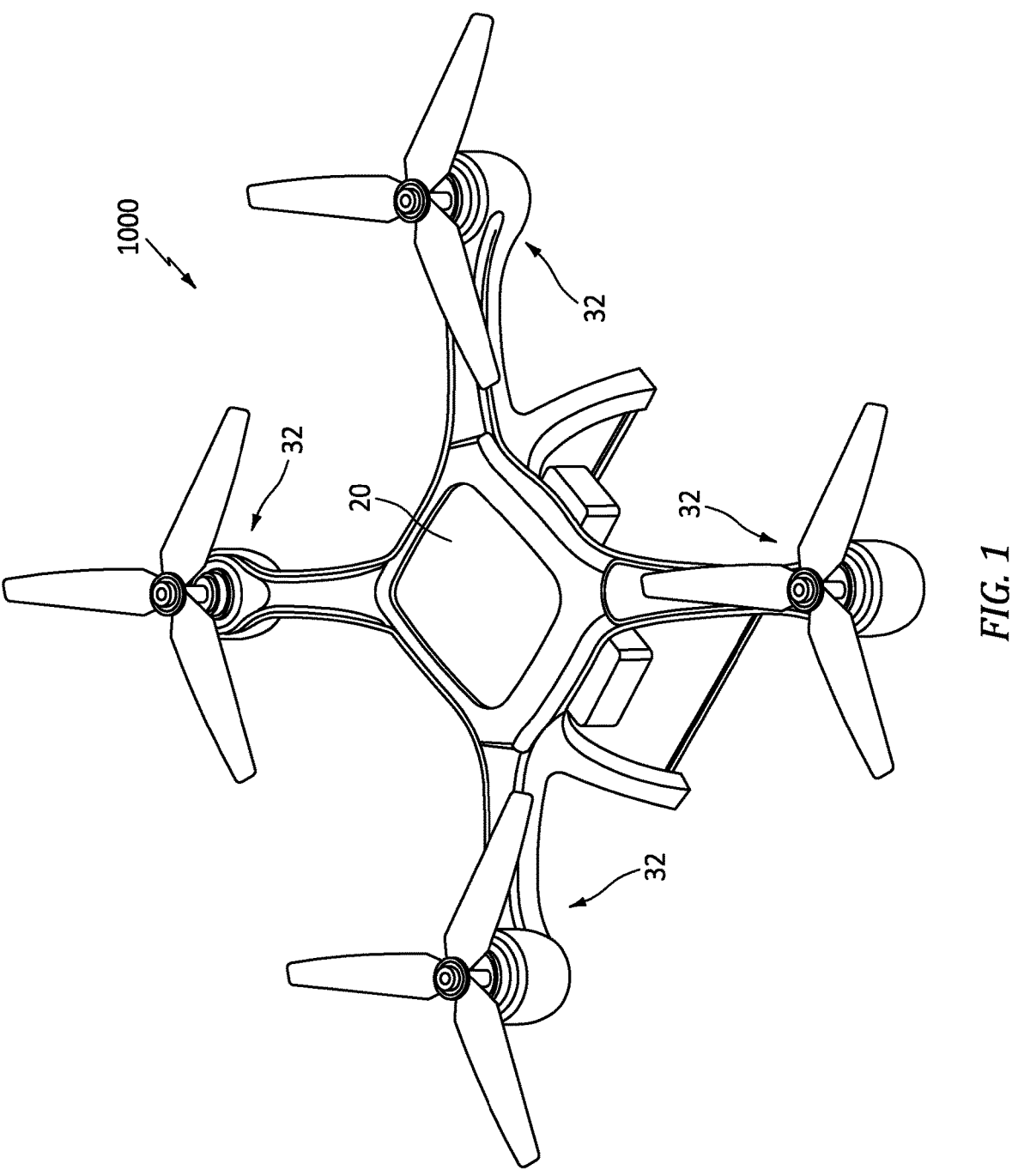
FIG. 1 illustrates a perspective view of an aircraft including a propulsion system, in accordance with one or more embodiments of the present disclosure.

FIG. 1 illustrates an aircraft 1000 including a propulsion system 20. Briefly, the aircraft 1000 may be an unmanned aerial vehicle (UAV, e.g., a drone). For example, the aircraft 1000 may be configured as a quadcopter (e.g., as shown in FIG. 1) or another UAV configuration. Alternatively, the aircraft 1000 may be a fixed-wing aircraft (e.g., an airplane), a rotary-wing aircraft (e.g., a helicopter), a tilt-rotor aircraft, a tilt-wing aircraft, or another aerial vehicle. The propulsion system 20 is configured to facilitate propulsion and electrical power generation for the aircraft 1000.

Figure 2:
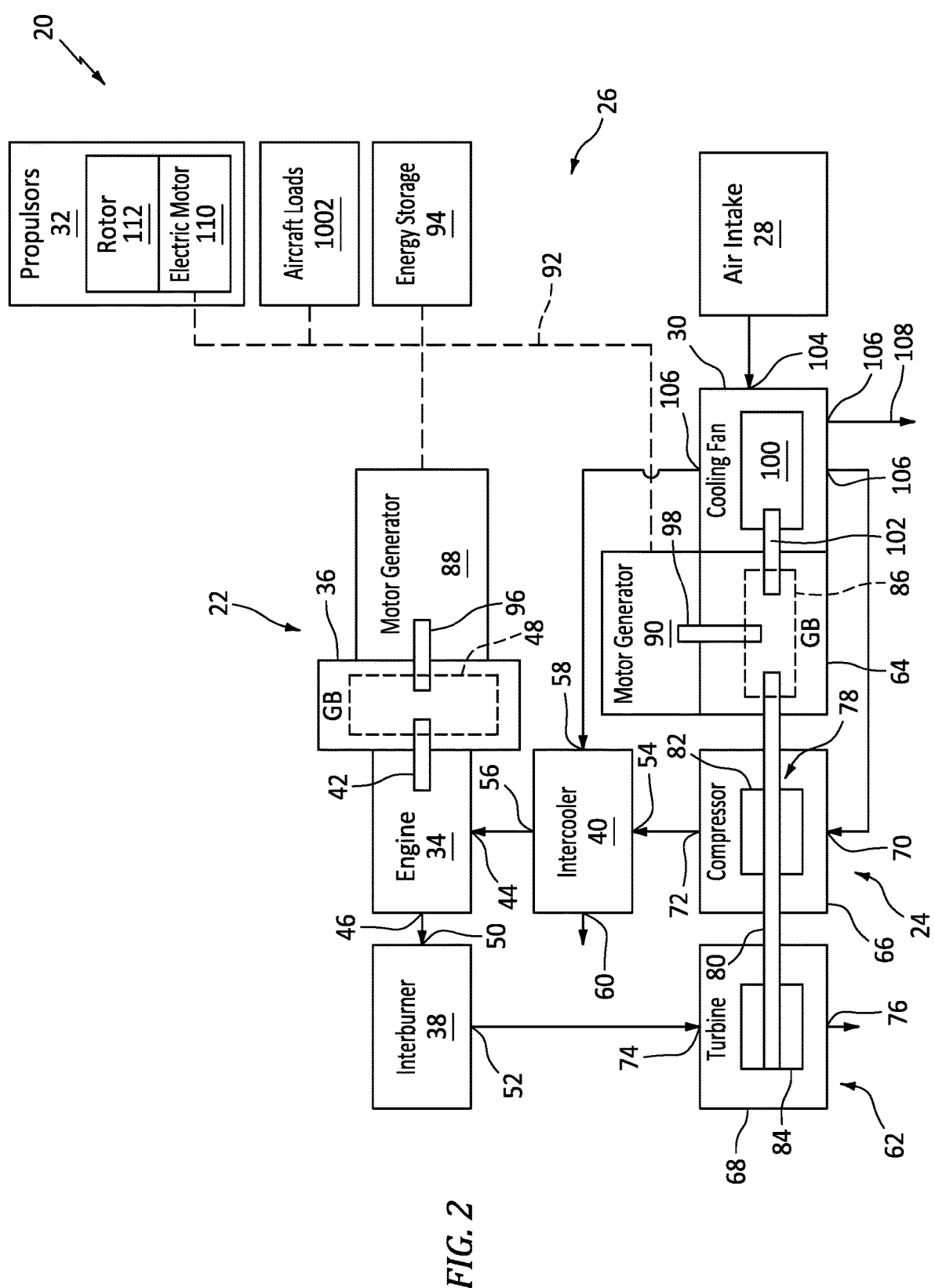
FIG. 2 schematically illustrates a propulsion system for an aircraft, in accordance with one or more embodiments of the present disclosure.

FIG. 2 schematically illustrates the propulsion system 20. The propulsion system 20 of FIG. 2 includes an engine assembly 22, a turbocompressor 24, an electrical assembly 26, an air intake 28, a cooling fan 30, and one or more propulsors 32 (e.g., vertical take-off and landing (VTOL) propulsors).

The engine assembly 22 includes an engine 34, a gearbox 36, an interburner 38, and an intercooler 40.

The engine 34 is an internal combustion engine configured to use intermittent combustion during operation. In other words, the engine 34 may be an engine configuration other than a gas turbine engine configuration. For example, the engine 34 may be a reciprocating engine such as, but not limited to, a piston engine or a rotary engine (e.g., a Wankel engine). The engine 34 includes an engine output shaft 42, an air inlet 44, and an exhaust outlet 46. The engine 34 is configured to drive rotation of the engine output shaft 42. The engine output shaft 42 is operably connected (e.g., coupled) to the gearbox 36. The engine 34 is configured to receive compressed air from the intercooler 40 at the air inlet 44 and direct combustion gas (e.g., exhaust gas) to the interburner 38 at the exhaust outlet 46.

The gearbox 32 includes at least one gear assembly 48 operably connected (e.g., coupled) to the engine output shaft 42. The gear assembly 48 may include an epicyclic gear assembly (e.g., a planetary gear assembly). The present disclosure, however, is not limited to any particular gear configuration for the gear assembly 48.

The interburner 38 forms a combustion chamber in which the combustion gas from the engine 34 is mixed and burned with fuel. The interburner 38 includes an inlet 50 and an outlet 52. The inlet 50 is connected in fluid communication (e.g., using any suitable conduit, pipe, tube, hose, etc.) with the exhaust outlet 46 to receive combustion gas from the engine 34. The interburner 38 is configured to direct combustion gas to the turbocompressor 24 at the outlet 52.

The intercooler 40 is configured as a heat exchanger for cooling the compressed air directed to the air inlet 44 of the engine 34. The intercooler 40 includes a first inlet 54 and a first outlet 56 for a primary heat exchanger side of the intercooler 40. The intercooler 40 includes a second inlet 58 and a second outlet 60 for a secondary heat exchanger side of the intercooler 40. The intercooler 40 is configured to receive compressed air from the turbocompressor 24 at the first inlet 54. The first outlet 56 is connected in fluid communication (e.g., using any suitable conduit, pipe, tube, hose, etc.) with the air inlet 44. The compressed air is cooled by heat transfer from the primary heat exchanger side to the secondary heat exchanger side, and directed to the air inlet 44 of the engine 34 from the first outlet 56. The second inlet 58 is connected in fluid communication (e.g., using any suitable conduit, pipe, tube, hose, etc.) with the air intake 28 and/or the cooling fan 30. For example, the intercooler 40 is configured to receive cooling air (e.g., ambient air) from the cooling fan 30 at the second inlet 58. The intercooler 40 is configured to exhaust this cooling air from the propulsion system 20 through the second outlet 60.

Turbocompressor assembly 24 of FIG. 2 includes a turbocompressor 62 and a gearbox 64. The turbocompressor 62 includes a compressor 66 and a turbine 68. The compressor 66 includes an inlet 70 and an outlet 72. The inlet 70 is connected in fluid communication (e.g., using any suitable conduit, pipe, tube, hose, etc.) with the air intake 28 and/or the cooling fan 30. For example, the compressor 66 is configured to receive air (e.g., ambient air) from the cooling fan 30 at the inlet 70. The outlet 72 is connected in fluid communication (e.g., using any suitable conduit, pipe, tube, hose, etc.) with the intercooler 40 (e.g., the first inlet 54) to direct compressed air to the intercooler 40. The turbine 68 includes an inlet 74 and an outlet 76. The inlet 74 is connected in fluid communication (e.g., using any suitable conduit, pipe, tube, hose, etc.) with the interburner 38 (e.g., the outlet 52). The turbine 68 is configured to receive the combustion gas from the interburner 38 at the inlet 74. The turbine 68 is configured to exhaust the combustion gas from the propulsion system 20 through the outlet 76.

Components of the compressor 66 and the turbine 68 form a rotational assembly 78 mounted for rotation about a rotational axis (e.g., an axial centerline of the turbocompressor 24). The rotational assembly 78 includes a shaft 80, a bladed compressor rotor 82 for the compressor 66, and a bladed turbine rotor 84 for the turbine 68. The shaft 80 interconnects the bladed compressor rotor 82 and the bladed turbine rotor 84.

The gearbox 64 includes at least one gear assembly 86 operably connected (e.g., coupled) to the rotational assembly 78 (e.g., the shaft 80). The gear assembly 86 may include an epicyclic gear assembly (e.g., a planetary gear assembly). The present disclosure, however, is not limited to any particular gear configuration for the gear assembly 86.

The electrical assembly 26 of FIG. 2 includes a first electric motor-generator 88, a second electric motor-generator 90, and an electrical distribution system 92. The electrical assembly 26 may additionally include an energy storage device 44.

The first electric motor-generator 88 is operably connected (e.g., coupled) to the engine 34 (e.g., the engine output shaft 42) by the gearbox 36 (e.g., the gear assembly 48). The first electric motor-generator 88 of FIG. 2 includes a drive shaft 96 operably connected to the gear assembly 48. The gear assembly 48 may be a speed-changing gear assembly configured to drive rotation of the first electric motor-generator 88 (e.g., the drive shaft 96) at a different rotational speed than the engine output shaft 42, and vice versa. The first electric motor-generator 88 is electrically connected to the electrical distribution system 92. The first electric motor-generator 88 is configured to generate an electrical power output, in response to driving rotation from the engine 34 (e.g., the engine output shaft 42), and direct the electrical power output to the electrical distribution system 92 (e.g., a generating operational mode). Alternatively, the first electric motor-generator 88 is configured to receive an electrical power input from the electrical distribution system 92 (e.g., from the second electric motor-generator 90, the energy storage device 94, or a power source external to the propulsion system 20 or the aircraft 1000 (e.g., ground-based power system or an on-board power system of the aircraft 1000) and drive or assist rotation of the engine output shaft 42 through the gear assembly 48 (e.g., a motoring operational mode). The electrical power input and/or output of the first electric motor-generator 88 may be in the form of an alternating current (AC) or a direct current (DC), and the present disclosure is not limited to any particular configuration of the first electric motor-generator 88.

The second electric motor-generator 90 is operably connected (e.g., coupled) to the rotational assembly 78 (e.g., shaft 80) by the gearbox 64 (e.g., the gear assembly 86). The second electric motor-generator 90 of FIG. 2 includes a drive shaft 98 operably connected to the gear assembly 86. The gear assembly 86 may be a speed-changing gear assembly configured to drive rotation of the second electric motor-generator 90 (e.g., the drive shaft 98) at a different rotational speed than the rotational assembly 78, and vice versa. The second electric motor-generator 90 is electrically connected to the electrical distribution system 92. The second electric motor-generator 90 is configured to generate an electrical power output, in response to driving rotation from the rotational assembly 78 (e.g., the shaft 80), and direct the electrical power output to the electrical distribution system 92 (e.g., a generating operational mode). Alternatively, the second electric motor-generator 90 is configured to receive an electrical power input from the electrical distribution system 92 (e.g., from the second electric motor-generator 90, the energy storage device 94, or a power source external to the propulsion system 20 or the aircraft 1000 (e.g., ground-based power system or an on-board power system of the aircraft 1000) and drive or assist rotation of the rotational assembly 78 (e.g., the shaft 80) through the gear assembly 86 (e.g., a motoring operational mode). The electrical power input and/or output of the second electric motor-generator 90 may be in the form of an alternating current (AC) or a direct current (DC), and the present disclosure is not limited to any particular configuration of the second electric motor-generator 90.

The electrical distribution system 92 electrically connects components of the electrical assembly 26. The electrical distribution system 92 includes switchgear, cables, wires, breakers, switches, electrical power conditional and/or conversion (e.g., AC to DC or DC to AC conversion) components, and/or other electrical components to effect the transfer of electrical power between components of the electrical assembly 26. The electrical distribution system 92 may additionally include one or more electrical power controllers, for example, to control a magnitude and/or direction of electrical current flow to components of the electrical assembly 26. The electrical distribution system 92 is configured to supply electrical power to one or more electrical aircraft loads 1002 of the aircraft 1000. Examples of the electrical aircraft loads 1002 include, but are not limited to, electronic control systems, communication systems, and navigation systems, optical equipment, electrical actuators, and lasers.

The energy storage device 94 may be configured to store electrical energy (e.g., generated by the first electric motor-generator 88 and/or the second electric motor-generator 90) for use by components of the electrical assembly 26 and/or the electrical aircraft loads 1002. The energy storage device 94 may be configured as a battery, a capacitor (e.g., a supercapacitor), and/or another electrical energy storage device. For example, the energy storage device 94 may be configured as a battery including a plurality of battery modules (e.g., battery packs), battery cells, and/or the like electrically connected together in series and/or parallel as necessary to configure the battery with the desired electrical characteristics (e.g., voltage output, current output, storage capacity, etc.). The present disclosure is not limited to any particular battery configuration. For example, the battery (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like.

The air intake 28 is configured to receive and direct ambient air to the cooling fan 30. The air intake 28 may form a duct for the cooling fan 30 (e.g., within which duct the cooling fan 30 may be disposed). Alternatively, the air intake 28 may form a scoop or other opening at an exterior of the aircraft 1000 or its propulsion system 20.

The cooling fan 30 includes a fan rotor 100, an input shaft 102, an air inlet 104, and one or more air outlets 106. The fan rotor 100 is connected to the input shaft 102. The input shaft 102 is operably connected (e.g., coupled) to the gearbox 64 (e.g., the gear assembly 86). The fan rotor 100 (e.g., the input shaft 102) is configured to be rotationally driven by the rotational assembly 78 and/or the second electric motor generator 90 through the gear assembly 86. The air inlet 104 is connected in fluid communication (e.g., using any suitable conduit, pipe, tube, hose, etc.) with the air intake 28. The one or more air outlets 106 may be connected in fluid communication (e.g., using any suitable conduit, pipe, tube, hose, etc.) with the intercooler 40 (e.g., the second inlet 58) and the compressor 66 (e.g., the inlet 70). The cooling fan 30 may additionally be configured to direct at least a portion of air flow from the air inlet 104 out of the aircraft 1000 and its propulsion system 20 from the one or more air outlets 106 (e.g., in a vertically downward direction) to generate lift for the aircraft 1000 (illustrated schematically in FIG. 2 as lifting airflow 108).

Each of the propulsors 32 of FIG. 2 includes an electric motor 110 and a propulsor rotor 112. The electric motor 110 is electrically connected to the electrical distribution system 92. The electric motor 110 is operably connected (e.g., coupled) to the propulsor rotor 112 to drive rotation of the propulsor rotor 112, for example, to provide lift, directional propulsion in three dimensions, and/or to control aircraft 1000 orientation (e.g., relative to a yaw axis, a pitch axis, and a roll axis). One or more of the propulsors 32 may be configured as a vertical take-off and landing (VTOL) propulsor. For example, one or more of the propulsors 32 may be pivotable to further control the aircraft 1000 lift, directional propulsion, and orientation. As shown in FIG. 1, for a quadcopter configuration of the aircraft 1000, the propulsion system 20 may include four propulsors 32. The present disclosure, however, is not limited to any particular number of the propulsors 32. The propulsors 32 may alternatively be configured for short take-off and vertical landing (STOVL) or conventional take-off and landing operations. For example, the propulsors 32 may be configured as propeller (e.g., a tractor propeller configuration or a pusher propeller configuration).

In operation of the propulsion system 20, ambient air is directed from the air intake 28 to the intercooler 40 (e.g., the second inlet 58) and the compressor 66 (e.g., the inlet 70) by the cooling fan 30. As previously discussed, the cooling fan 30 may additionally direct air from the air intake 28 to generate lift for the aircraft 1000. The ambient air is compressed by the compressor 66, directed through the primary heat exchanger side of the intercooler 40 where the compressed air is cooled, and then supplied to the engine 34 (e.g., the air inlet 44). The compressed air is mixed and burned with fuel in the engine 34 in an intermittent combustion cycle to drive rotation of the engine output shaft 42. Combustion gas from the engine 34 is directed from the exhaust outlet 46 to the interburner 38 (e.g., the inlet 50). This combustion gas from the engine 34 is mixed and burned with fuel in the interburner 38, and the resultant combustion gas is directed from the outlet 52 to the inlet 74 and through the turbine 68. The bladed turbine rotor 84 rotationally drives the rotational assembly 78 in response to the combustion gas flow through the turbine 68. In particular, the bladed turbine rotor 84 rotationally drives the bladed compressor rotor 82, to compress the ambient air for the engine 34. The bladed turbine rotor 84 further rotationally drives the cooling fan 30 (e.g., the fan rotor 100 and the input shaft 102) through the gearbox 64 (e.g., the gear assembly 86). The propulsors 32 are powered by the electrical assembly 26 to provide lift, directional propulsion, and/or to control aircraft 1000 orientation.

During operation of the propulsion system 20, the engine 34 (e.g., the engine output shaft 42) may rotationally drive the first electric motor-generator 88 through the gearbox 36 (e.g., the gear assembly 48) to generate an electrical power output for use and/or storage by components of the electrical assembly 26 and/or the electrical aircraft loads 1002. Similarly, the rotational assembly 78 (e.g., the shaft 80) may rotationally drive the second electric motor-generator 90 through the gearbox 64 (e.g., the gear assembly 86) to generate an electrical power output for use and/or storage by components of the electrical assembly 26 and/or the electrical aircraft loads 1002. During some operating conditions, such as a propulsion system 20 startup sequence, the first electric motor-generator 88 may drive or assist rotation of the engine output shaft 42 using electrical power from the second electric motor-generator 90, the energy storage device 94, an onboard power supply (e.g., a generator and/or an energy storage device) of the aircraft 1000, and/or a ground-based power supply 1008 electrically connected to the electrical distribution system 92. Similarly, the second electric motor-generator 90 may drive or assist rotation of the rotational assembly 78 (e.g., the shaft) using electrical power from the first electric motor-generator 88, the energy storage device 94, an onboard power supply (e.g., a generator and/or an energy storage device) of the aircraft 1000, and/or a ground-based power supply electrically connected to the electrical distribution system 92.

The present disclosure configuration of the propulsion system 20 facilitates mechanical independence between the engine 34 (e.g., the engine output shaft 38) and the turbocompressor 62 (e.g., the rotational assembly 78). In other words, the engine output shaft 42 and the rotational assembly 78 are not operably connected by any mechanical coupling component or assembly such as, but not limited to, a shaft, a gearbox, a belt, a clutch, a transmission (e.g., a hydrostatic transmission), or the like. This mechanical independence between the engine 34 and the turbocompressor 62 facilitates greater flexibility in propulsion system 20 packaging (e.g., relative orientations and proximity between the engine 34 and the turbocompressor 62) within the aircraft 1000. This mechanical independence between the engine 34 and the turbocompressor 62 additionally facilitates independent speed control of the engine 34 and the turbocompressor 62, thereby facilitating optimal operation across a range of aircraft 1000 altitudes and operating conditions. For the propulsion system 20, the engine 34 and the turbocompressor 62 independently facilitate generation of electrical power for the components of the electrical assembly 26 and/or the electrical aircraft loads 1002. For example, independent fuel flows to the engine 34 and the interburner 38 facilitate optimized turbocompressor 62 speed and engine 34 power for aircraft 1000 propulsion while efficiently meeting electrical loading (e.g., electrical aircraft loads 1002) requirements, thereby providing significant fuel savings in comparison to conventional intermittent combustion engine or gas turbine engine configurations.

Figure 3:
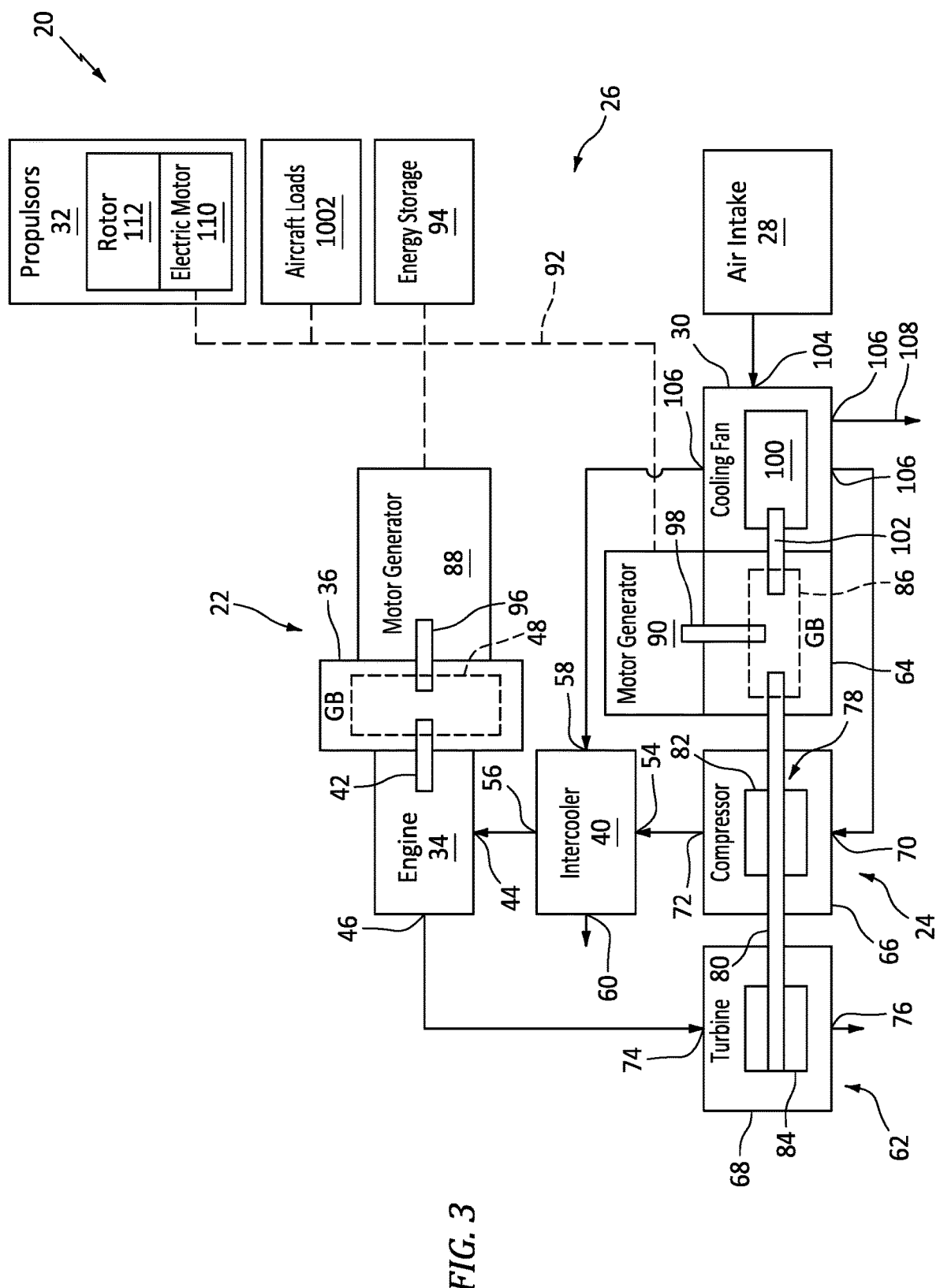
FIG. 3 schematically illustrates another propulsion system for an aircraft, in accordance with one or more embodiments of the present disclosure.

Referring to FIG. 3, in some embodiments of the propulsion system 20, the exhaust outlet 46 may be directly connected in fluid communication (e.g., using any suitable conduit, pipe, tube, hose, etc.) with the inlet 74. In other words, the propulsion system 20 may not include the interburner 38 (see FIG. 2). In operation of the propulsion system 20 of FIG. 3, the combustion gas from the engine 34 is directed from the exhaust outlet 46 to the inlet 74 and through the turbine 68. The bladed turbine rotor 84 rotationally drives the rotational assembly 78 in response to the combustion gas flow through the turbine 68. In particular, the bladed turbine rotor 84 rotationally drives the bladed compressor rotor 82, to compress the ambient air for the engine 34. The bladed turbine rotor 84 further rotationally drives the cooling fan 30 (e.g., the fan rotor 100 and the input shaft 102) through the gearbox 64 (e.g., the gear assembly 86). The direct fluid connection between the exhaust outlet 46 and the inlet 74 may facilitate a simplified propulsion system 20 configuration and/or alternative packaging configurations of the propulsion system 20 within the aircraft 1000 (see FIG. 1).

Figure 4:
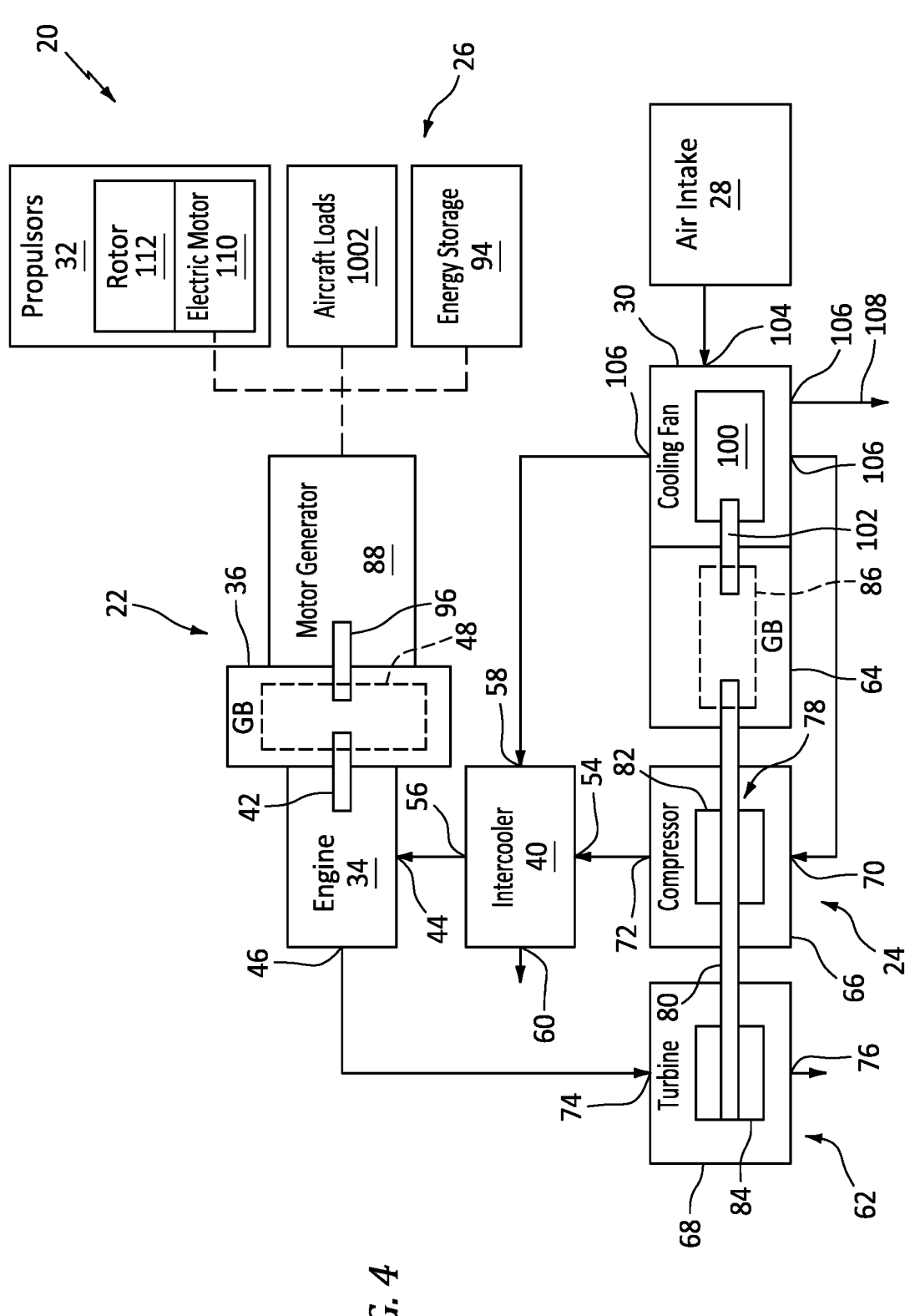
FIG. 4 schematically illustrates another propulsion system for an aircraft, in accordance with one or more embodiments of the present disclosure.

Referring to FIG. 4, in some embodiments of the propulsion system 20, the electrical assembly 26 may not include an electric motor and/or an electric generator (e.g., the second electric motor-generator 90; see FIG. 2) mechanically coupled with the rotational assembly 78 or the cooling fan 30 (e.g., through the gearbox 64 and its gear assembly 86). For example, in operation of the propulsion system 20 of FIG. 4, the fan rotor 100 may be driven solely by the rotational assembly 78 (e.g., the shaft 80) through the gearbox 64 (e.g., the gear assembly 86). The fan rotor 100 driven only by the rotational assembly 78 may facilitate a simplified propulsion system 20 configuration and/or alternative packaging configurations of the propulsion system 20 within the aircraft 1000.

Figure 5:
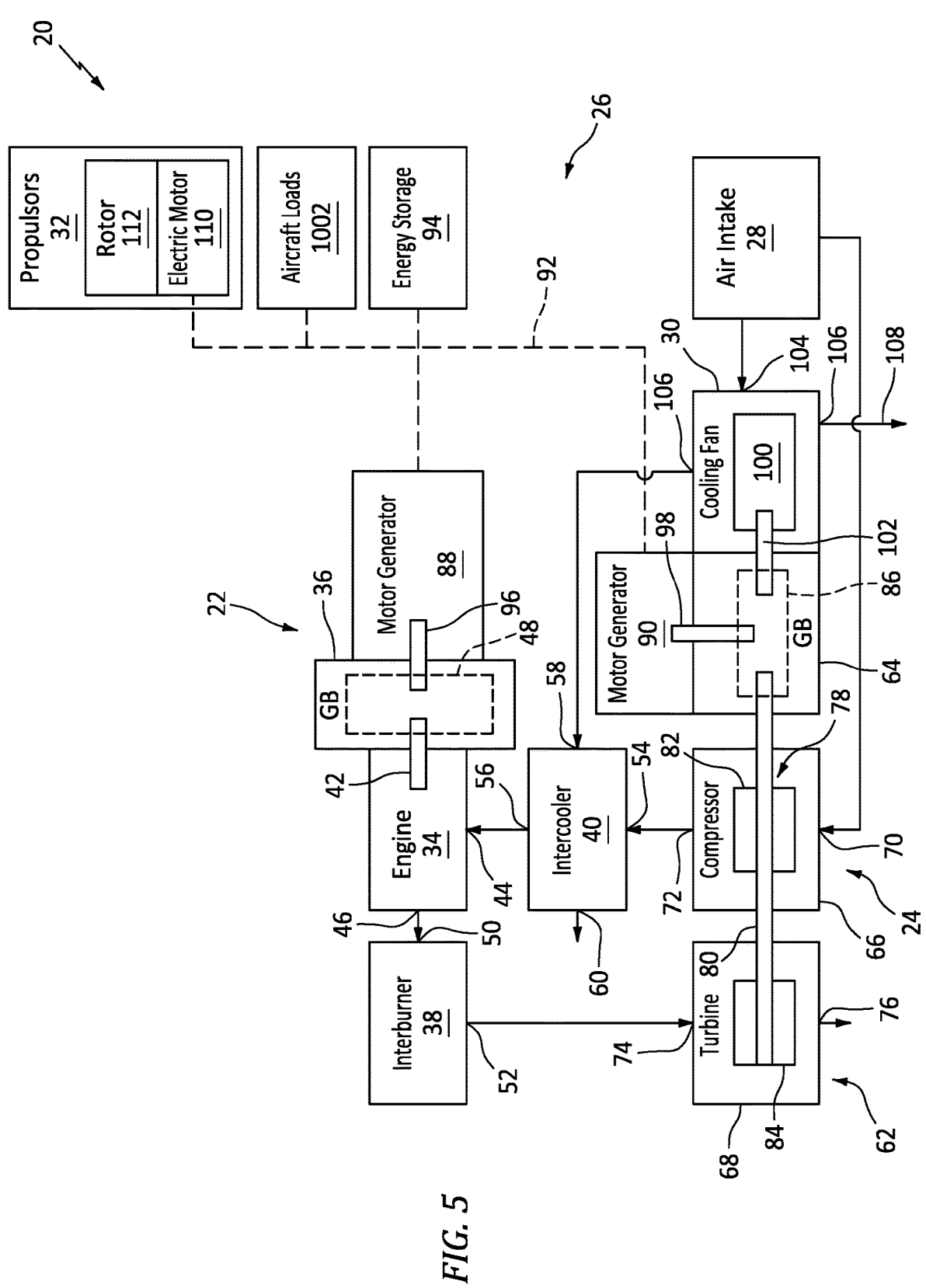
FIG. 5 schematically illustrates another propulsion system for an aircraft, in accordance with one or more embodiments of the present disclosure.

Referring to FIG. 5, in some embodiments of the propulsion system 20, the compressor 66 (e.g., the inlet 70) may be directly connected in fluid communication (e.g., using any suitable conduit, pipe, tube, hose, etc.) with the air intake 28. For example, in operation of the propulsion system 20 of FIG. 5, ambient air may be directed from the air intake 28 to the compressor 66 (e.g., the inlet 70). The ambient air from the air intake 28 may be compressed by the compressor 66, directed through the primary heat exchanger side of the intercooler 40 where the compressed air is cooled, and then supplied to the engine 34 (e.g., the air inlet 44). The direct fluid connection between the air intake 28 and the compressor 66 may facilitate alternative packaging configurations of the propulsion system 20 within the aircraft 1000 (see FIG. 2) and/or facilitate improved generation of the lift by the cooling fan 30.

Figure 6:
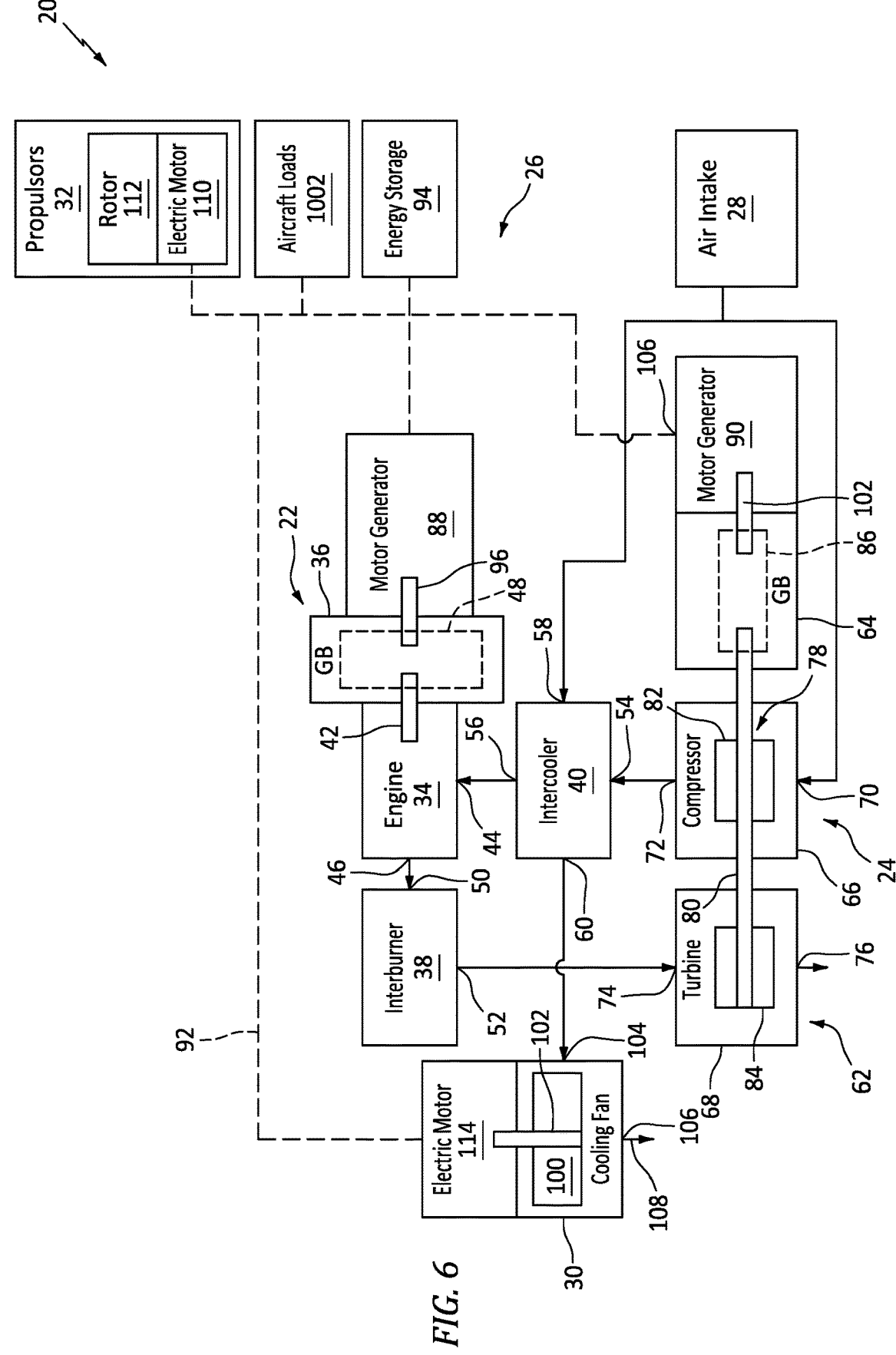
FIG. 6 schematically illustrates another propulsion system for an aircraft, in accordance with one or more embodiments of the present disclosure.

Referring to FIG. 6, in some embodiments of the propulsion system 20, the cooling fan 30 (e.g., the air inlet 104) may be connected in fluid communication (e.g., using any suitable conduit, pipe, tube, hose, etc.) with and downstream of the intercooler 40 (e.g., the second outlet 60). The cooling air from the intercooler 40 is exhausted from the cooling fan 30 through the air outlet 106 (e.g., as the lifting airflow 108). The electrical assembly 26 of FIG. 6 includes an electric motor 114. The electric motor 114 is operably connected (e.g., coupled) to the fan rotor 100 (e.g., the input shaft 102) to drive rotation of the fan rotor 100. The electric motor 114 is electrically connected to the electrical distribution system 92. In operation of the propulsion system 20 of FIG. 6, ambient air from the air intake 28 may be drawn through the secondary heat exchanger side of the intercooler 40 (e.g., from the second inlet 58 to the second outlet 60) and exhausted from the aircraft 1000 (see FIG. 1) and its propulsion system 20 through the air outlet 106. The exhaust of the air from the air outlet 106 may generate additional lift for the aircraft 1000. The configuration of the cooling fan 30 at the second outlet 60 may facilitate improved cooling air flow through the second heat exchanger side of the intercooler 40, improved generation of the lift by the cooling fan 30, and alternative packaging configurations of the propulsion system 20 within the aircraft 1000.

Figure 7:
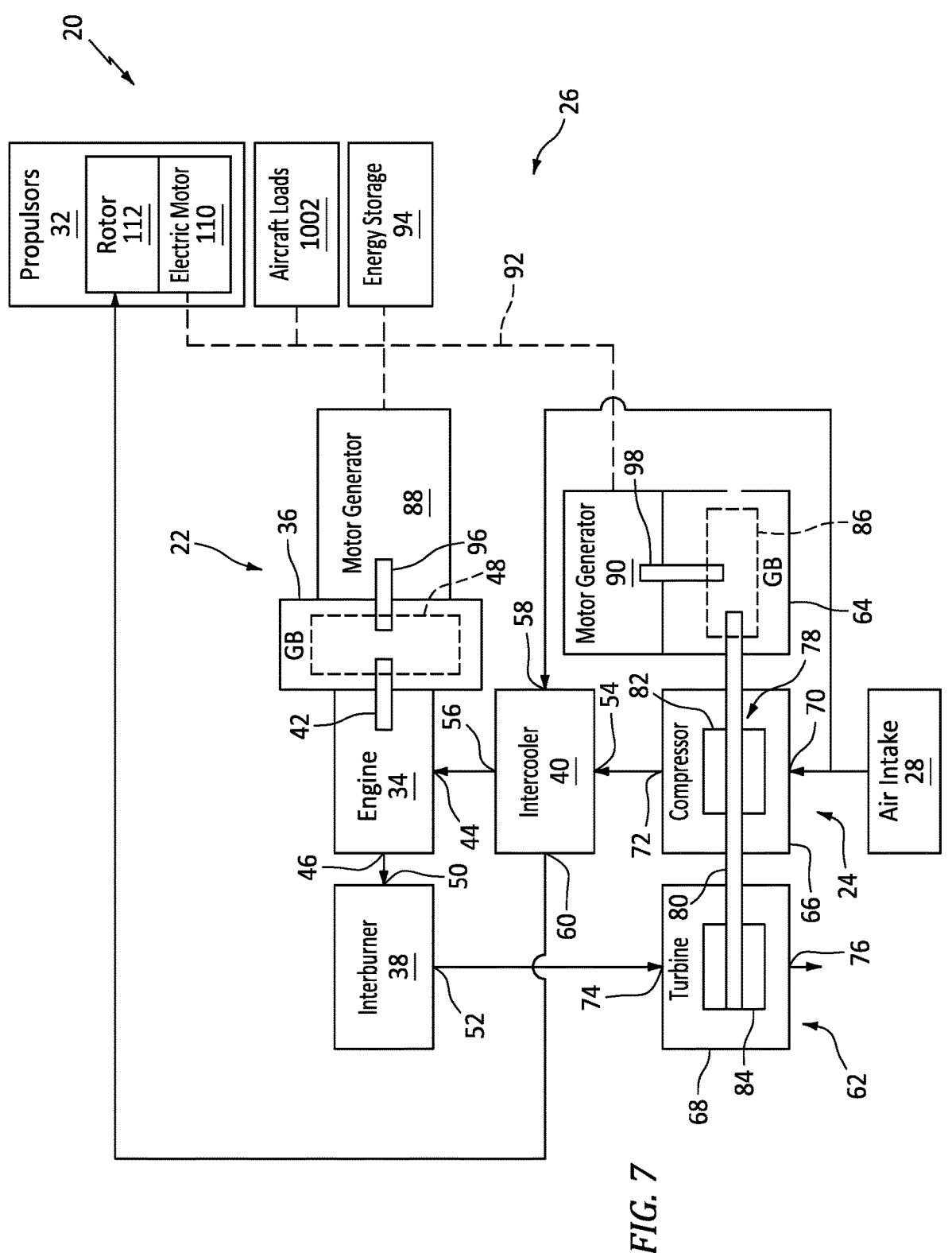
FIG. 7 schematically illustrates another propulsion system for an aircraft, in accordance with one or more embodiments of the present disclosure.
Figure 8:
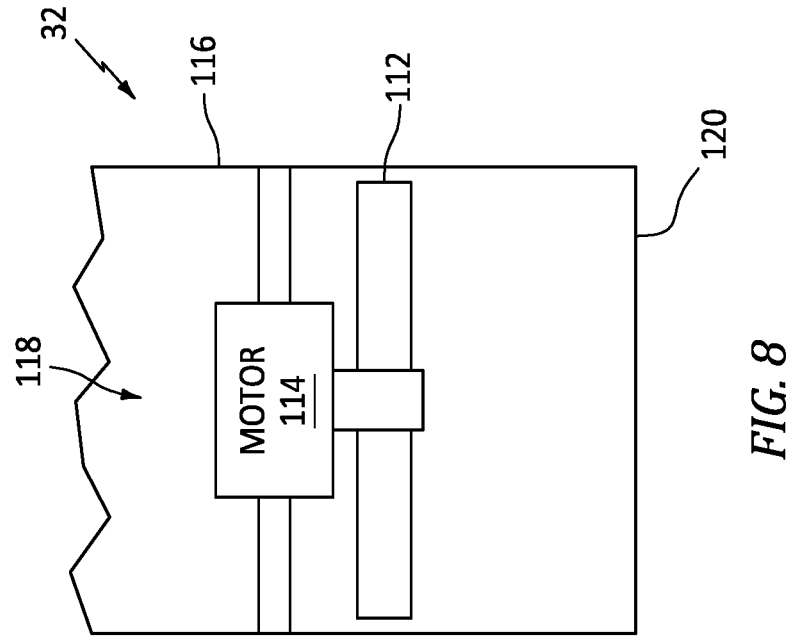
FIG. 8 schematically illustrates a cutaway, side view of a propulsor for an aircraft propulsion system, in accordance with one or more embodiments of the present disclosure.

Referring to FIG. 7, in some embodiments of the propulsion system 20, the air intake 28 may be directly connected in fluid communication (e.g., using any suitable conduit, pipe, tube, hose, etc.) with the intercooler 40 (e.g., the second inlet 58) and the compressor 66 (e.g., the inlet 70). In other words, the propulsion system 20 may not include the cooling fan 30 (see FIG. 2). The intercooler 40 (e.g., the second outlet 60) is connected in fluid communication (e.g., using any suitable conduit, pipe, tube, hose, etc.) with one or more of the propulsors 32. In operation of the propulsion system 20 of FIG. 7, ambient air is directed from the air intake 28 to the intercooler 40 (e.g., the second inlet 58) and the compressor 66 (e.g., the inlet 70). The ambient air is drawn through the second heat exchanger side of the intercooler 40 by the propulsors 32. The propulsors 32 direct the ambient air from the intercooler 40 to provide lift, directional propulsion, and/or to control aircraft 1000 orientation (see FIG. 1). As shown in FIG. 8, one or more of the propulsors 32 may have a ducted configuration in which the propulsor rotor 112 is circumscribed by a propulsor duct 116. The propulsor duct 116 may form a propulsor inlet 118 and a propulsor outlet 120. The propulsor inlet 118 may be connected in fluid communication (e.g., using any suitable conduit, pipe, tube, hose, etc.) with the intercooler 40 (e.g., the second outlet 60). Rotation of the propulsor rotor 112 (e.g., by the electric motor 114) within the propulsor duct 116 draws air through the intercooler 40 and directs the air from the propulsor outlet 120 to provide lift, directional propulsion, and/or to control aircraft 1000 orientation. The ambient air is compressed by the compressor 66, directed through the primary heat exchanger side of the intercooler 40 where the compressed air is cooled, and then supplied to the engine 34 (e.g., the air inlet 44).

Figure 9:
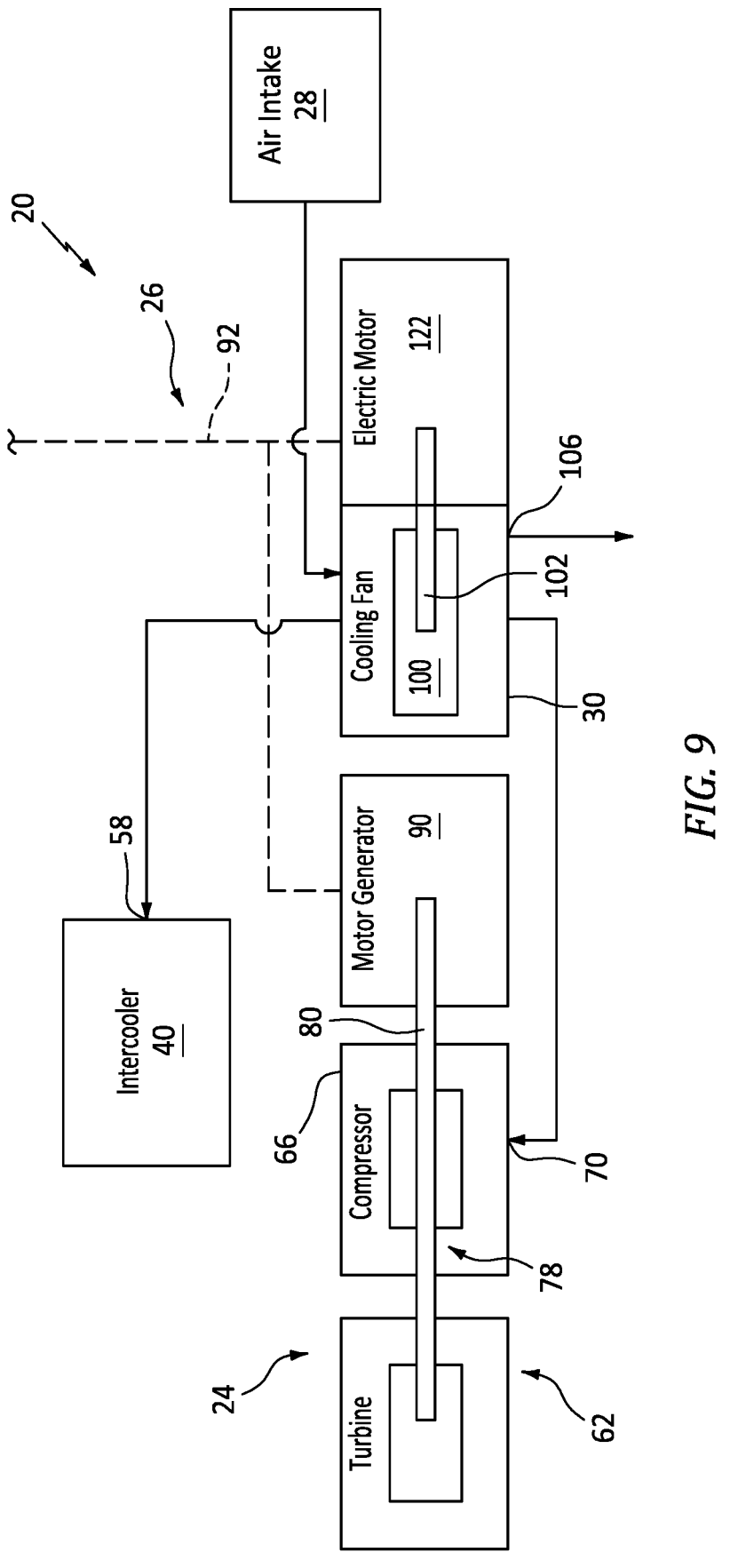
FIG. 9 schematically illustrates a portion of another propulsion system for an aircraft, in accordance with one or more embodiments of the present disclosure.

Referring to FIG. 9, in some embodiments of the propulsion system 20, the electrical assembly 26 may include an electric motor 122. The electric motor 122 is operably connected (e.g., coupled) to the fan rotor 100 (e.g., the input shaft 102) to drive rotation of the fan rotor 100. The electric motor 122 is electrically connected to the electrical distribution system 92. In operation of the propulsion system 20 of FIG. 9, ambient air from the air intake 28 is directed by the cooling fan 30 to the intercooler 40 (e.g., the second inlet 58) and the compressor 66 (e.g., the inlet 70). The cooling fan 30 may additionally exhaust air from the air outlet 106 to generate additional lift for the aircraft 1000. Additionally or alternatively, in some embodiments of the propulsion system 20, the turbocompressor 62 may be configured as a single module with the second electric motor-generator 90. The rotational assembly 78 may be directly coupled with the second electric motor-generator 90. For example, the shaft 80 may drive rotation of the second electric motor-generator 90 at a same rotational speed as the other rotational components of the rotational assembly 78. As a result, the turbocompressor assembly 24 of the propulsion system 20 of FIG. 9 may not include the gearbox 64 (see, e.g., FIG. 2). The configuration of the turbocompressor 62, the second electric motor-generator 90, and the cooling fan 30 of the propulsion system 20 of FIG. 9 facilitates reduced mechanical complexity of the propulsion system 20 as well as reduced weight and manufacturing cost.

Figure 10:
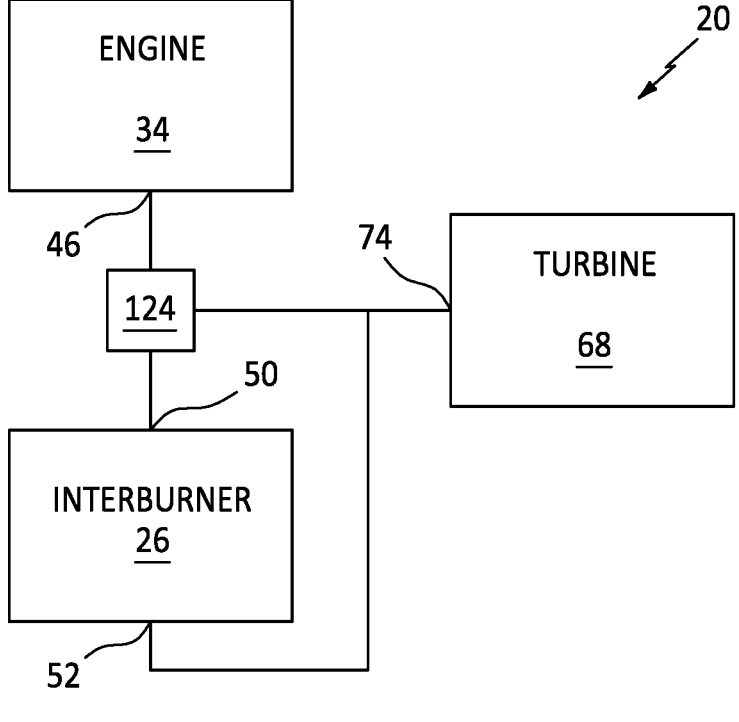
FIG. 10 schematically illustrates a portion of another propulsion system for an aircraft, in accordance with one or more embodiments of the present disclosure.

Referring to FIG. 10, in some embodiments of the propulsion system 20, the propulsion system 20 may include an engine exhaust diverter assembly 124. The engine exhaust diverter assembly 124 is connected in fluid communication (e.g., using any suitable conduit, pipe, tube, hose, etc.) with and between the engine 34 (e.g., the exhaust outlet 46), the interburner 26 (e.g., the inlet 50), and the turbine 68 (e.g., the inlet 74). The engine exhaust diverter subassembly 124 is a multi-directional flow diverter. In a first condition, the engine exhaust diverter assembly 124 may direct combustion gas from the exhaust outlet 46 to the inlet 50. In this first condition, the engine exhaust diverter assembly 124 may prevent or substantially prevent the flow of the combustion gas from (e.g., directly from) the exhaust outlet 46 to the turbine 68 (e.g., the inlet 74). In a second condition, the engine exhaust diverter assembly 124 may direct combustion gas from the exhaust outlet 46 to the turbine 68 (e.g., the inlet 74). In this second condition, the engine exhaust diverter assembly 124 may prevent or substantially prevent the flow of the combustion gas from (e.g., directly from) the exhaust outlet 46 to the inlet 50. For example, during higher-power conditions of the propulsion system 20, the engine exhaust diverter assembly 124 may be configured in the first condition to direct the combustion gas from the exhaust outlet 46 to the inlet 50 to be mixed and burned with fuel in the interburner 38, and then subsequently directed from the interburner 38 (e.g., the outlet 52) to the turbine 68 (e.g., the inlet 74). During lower-power conditions of the propulsion system 20, the engine exhaust diverter assembly 124 may be configured in the second condition to direct the combustion gas from the exhaust outlet 46 to the inlet 74, thereby bypassing the interburner 38. The engine exhaust diverter assembly 124 may also configurable in a closed condition in which the combustion gas from the exhaust outlet 46 does not flow through the engine exhaust diverter assembly 124 (e.g., to the interburner 38 or the turbine 68). In other words, in the closed condition, the engine exhaust diverter assembly 124 isolates the exhaust outlet 46 from the inlet 50 and the inlet 74. The engine exhaust diverter assembly 124 may be formed by a remotely-actuated multi-directional valve or an assembly of remotely-actuated valves configured to selectively direct the combustion gas from the exhaust outlet 46 as described above. The present disclosure, however, is not limited to the foregoing exemplary valve configuration of the engine exhaust diverter assembly 124.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently.

In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
   an air intake;

an engine assembly including an engine and an intercooler,
   the engine including an air inlet, an exhaust outlet, and an engine output shaft, and
   the intercooler including a first heat exchanger side having a first inlet and a first outlet and a second heat exchanger side having a second inlet and a second outlet, the first outlet is connected in fluid communication with the air inlet, and the second inlet is connected in fluid communication with the air intake;
a turbocompressor assembly including a turbocompressor, the turbocompressor including a turbine and a compressor, the turbine and the compressor forming a rotational assembly, the rotational assembly including a shaft, a bladed turbine rotor of the turbine, and a bladed compressor rotor of the compressor, the shaft of the rotational assembly interconnecting the bladed turbine rotor and the bladed compressor rotor, the turbine including a turbine inlet and a turbine outlet, the turbine inlet is connected in fluid communication with the exhaust outlet, the compressor including a compressor inlet and a compressor outlet, the compressor inlet is connected in fluid communication with the air intake, the compressor outlet is connected in fluid communication with the first inlet, and the rotational assembly is mechanically independent of the engine output shaft;
an electrical assembly including a first electric motor-generator and an electrical distribution system, the first electric motor-generator operably connected to the engine output shaft, the first electric motor-generator electrically connected to the electrical distribution system; and
at least one propulsor including an electric motor and a propulsor rotor, the electric motor is electrically connected to the electrical distribution system, and the propulsor rotor is operably connected to the electric motor.

2. The propulsion system of claim 1, further comprising a cooling fan including a fan rotor and an input shaft, the input shaft is connected to the fan rotor, the input shaft is operably connected to the rotational assembly, the cooling fan including a cooling fan inlet and at least one cooling fan outlet, and the cooling fan is connected in fluid communication with the second heat exchanger side to direct ambient air from the air intake through the second heat exchanger side.

3. The propulsion system of claim 2, wherein the cooling fan is connected in fluid communication with and between the air intake and the second heat exchanger side with the cooling fan inlet connected in fluid communication with the air intake and the at least one cooling fan outlet connected in fluid communication with the second inlet.

4. The propulsion system of claim 2, wherein the cooling fan is configured to exhaust ambient air from the air intake through the at least one cooling fan outlet to generate lift for the aircraft.

5. The propulsion system of claim 2, wherein the electrical assembly includes a second electric motor-generator operably connected to the shaft of the rotational assembly, and the second electric motor-generator is electrically connected to the electrical distribution system.

6. The propulsion system of claim 5, wherein the turbocompressor assembly further includes a gearbox, and the gearbox operably connects the shaft of the rotational assembly, the input shaft, and the second electric motor-generator.

7. The propulsion system of claim 1, further comprising a cooling fan including an electric motor, a fan rotor, a cooling fan inlet, and at least one cooling fan outlet, the electric motor is electrically connected to the electrical distribution system, the electric motor is operably connected to the fan rotor, and the cooling fan is connected in fluid communication with the second heat exchanger side to direct ambient air from the air intake through the second heat exchanger side.

8. The propulsion system of claim 7, wherein the cooling fan is connected in fluid communication with and downstream of the second heat exchanger side, and the cooling fan inlet is connected in fluid communication with the second outlet.

9. The propulsion system of claim 1, wherein the engine assembly includes an interburner, the interburner includes an interburner inlet and an interburner outlet, the interburner is connected in fluid communication with and between the engine and the turbine with the interburner inlet connected in fluid communication with the exhaust outlet and the interburner outlet connected in fluid communication with the turbine inlet.

10. The propulsion system of claim 1, wherein the electrical assembly further includes an energy storage device electrically connected to the electrical distribution system.

11. The propulsion system of claim 1, wherein each of the at least one propulsor is connected in fluid communication with the intercooler outlet.

12. The propulsion system of claim 1, wherein the engine is an intermittent combustion engine.

13. A propulsion system for an aircraft, the propulsion system comprising:

an air intake;

an engine assembly including an engine, an interburner, and an intercooler, the engine including an air inlet, an exhaust outlet, and an engine output shaft, the interburner including an interburner inlet and an interburner outlet, the interburner inlet is connected in fluid communication with the exhaust outlet, and the intercooler including a first heat exchanger side having a first inlet and a first outlet and a second heat exchanger side having a second inlet and a second outlet, the first outlet is connected in fluid communication with the air inlet, and the second inlet is connected in fluid communication with the air intake;

a turbocompressor assembly including a turbocompressor, the turbocompressor including a turbine and a compressor, the turbine and the compressor forming a rotational assembly, the rotational assembly including a shaft, a bladed turbine rotor of the turbine, and a bladed compressor rotor of the compressor, the shaft of the rotational assembly interconnecting the bladed turbine rotor and the bladed compressor rotor, the turbine including a turbine inlet and a turbine outlet, the turbine inlet is connected in fluid communication with the interburner outlet, the compressor including a compressor inlet and a compressor outlet, the compressor inlet is connected in fluid communication with the air intake, the compressor outlet is connected in fluid communication with the first inlet, and the rotational assembly is mechanically independent of the engine output shaft; and an electrical assembly including a first electric motor-generator, a second electric motor-generator, and an electrical distribution system, the first electric motor-generator is operably connected to the engine output shaft, the first electric motor-generator is electrically connected to the electrical distribution system, the second electric motor-generator is operably connected to the rotational assembly, and the second electric motor-generator is electrically connected to the electrical distribution system.

14. The propulsion system of claim 13, further comprising a cooling fan including a fan rotor and an input shaft, the input shaft is connected to the fan rotor, the input shaft is operably connected to the rotational assembly, the cooling fan including a cooling fan inlet and at least one cooling fan outlet, the cooling fan inlet is connected in fluid communication with the air intake, and the at least one cooling fan outlet is connected in fluid communication with the compressor inlet and the second inlet.

15. The propulsion system of claim 14, wherein the cooling fan is configured to exhaust ambient air from the air intake through the at least one cooling fan outlet to generate lift for the aircraft.

16. The propulsion system of claim 13, further comprising an engine exhaust diverter assembly connected in fluid communication with the exhaust outlet, the interburner inlet, and the turbine inlet, and the engine exhaust diverter assembly is selectively configurable in a first condition or a second condition:

in the first condition, the engine exhaust diverter subassembly connects the exhaust outlet in fluid communication with the interburner inlet, and in the second condition, the engine exhaust diverter subassembly connects the exhaust outlet in fluid communication with the turbine inlet.

* * * * *